July 6, 1948.　　　　　J. C. SHAW　　　　　2,444,711
OIL TEMPERATURE CONTROL VALVE
Filed June 9, 1945　　　　　　　　　　　　2 Sheets-Sheet 1
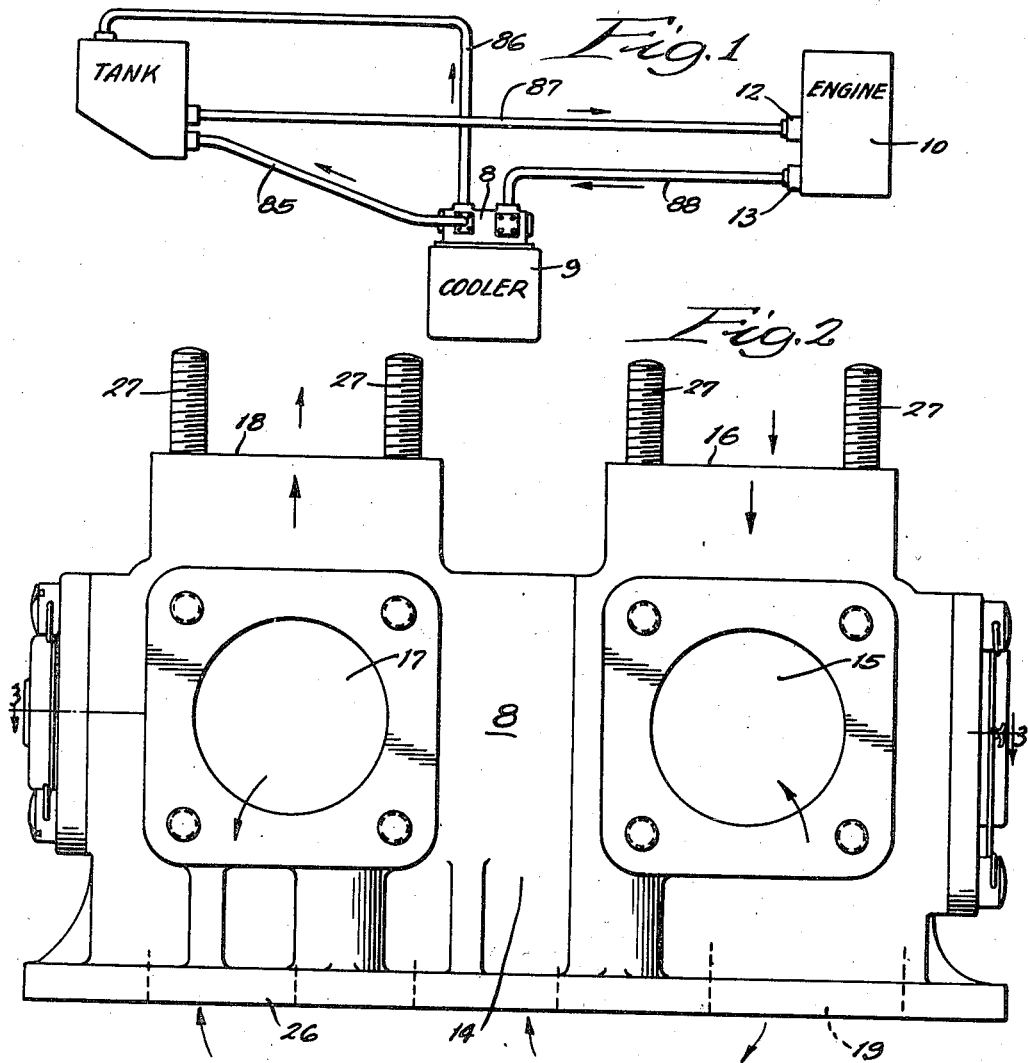
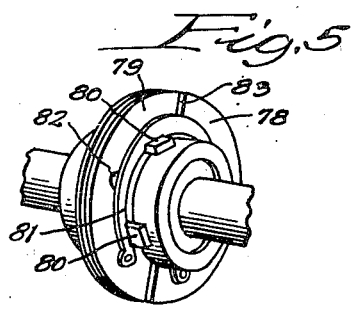
Inventor:
Joe C. Shaw,
By Soans, Pond & Anderson
Attorneys.

Inventor:
Joe C. Shaw,
By Soans, Pond, & Anderson
Attorneys.

Patented July 6, 1948

2,444,711

UNITED STATES PATENT OFFICE 2,444,711

OIL TEMPERATURE CONTROL VALVE

Joe C. Shaw, Racine, Wis., assignor to Young Radiator Company, Racine, Wis., a corporation of Wisconsin Application June 9, 1945, Serial No. 598,535

8 Claims. (Cl. 236—34)

This invention relates to temperature controlled valve mechanisms for heat exchange units used in connection with fluid cooling systems. It is particularly designed for use with heat exchange units for the oil cooling systems of aircraft engines which employ an auxiliary warmup chamber in connection with a cooling core. However, it can be applied to any kind of heat exchange unit requiring the automatic regulation of the flow of a heated viscous fluid through two or more related channels.

In modern aircraft, it is essential to superior operation of the engine to keep the lubricating oil as nearly as possible at uniform temperature. Such uniform temperature must be maintained regardless of the extremely varying atmospheric conditions around and above the earth's surface where aircraft are used. Accomplishing that uniform temperature demands a cooling system so regulated that the degree of heat-exchange exposure of the oil to the cooling medium may be varied automatically so as to compensate for the overall conditions of weather and the extremes of engine operation.

The pressure required to circulate the oil through the cooling system depends upon the viscosity of the oil. The viscosity of the oil, in turn, is dependent upon the comparative conditions of the weather and the heat of the oil created by the operation of the engine. Whenever these operative conditions are such that the oil becomes congealed, the pressure, created by the pump used for circulating the oil through the system, must be diverted from the heat exchange unit core until the viscosity of the oil becomes sufficiently reduced to permit the ready flow thereof through such core.

The main objects of this invention, therefore, are to provide a thermostatically-actuated valve mechanism for use with oil temperature-regulating units and caused by the temperature of the oil to automatically channel the flow of oil through alternative paths; to provide an improved arrangement of the valve mechanism in a dual outlet housing whereby the temperature of the oil determines through which of the outlets it will be directed from the heat exchange unit; to provide an improved valve mechanism of this kind suited for use with oil systems for aircraft engines so as to permit the return of the oil to the oil supply tank at a point near or at a point remote from the oil outlet from the tank to the engine dependent upon the temperature of the oil flowing through the valve mechanism; and to provide an improved construction and arrangement of means associated with said valve mechanism to permit a slight continuous flow of oil through the channels other than those through which the main oil flow is directed.

In the specific embodiment of this invention herein shown;

Fig. 1 is a diagrammatic view indicating the application of this improved type of valve mechanism to the oil cooling system for an aircraft engine.

Fig. 2 is an enlarged side elevation of the valve mechanism.

Fig. 5 is a perspective view of the sliding partition which constitutes one of the special features of this invention.

Figure 3:
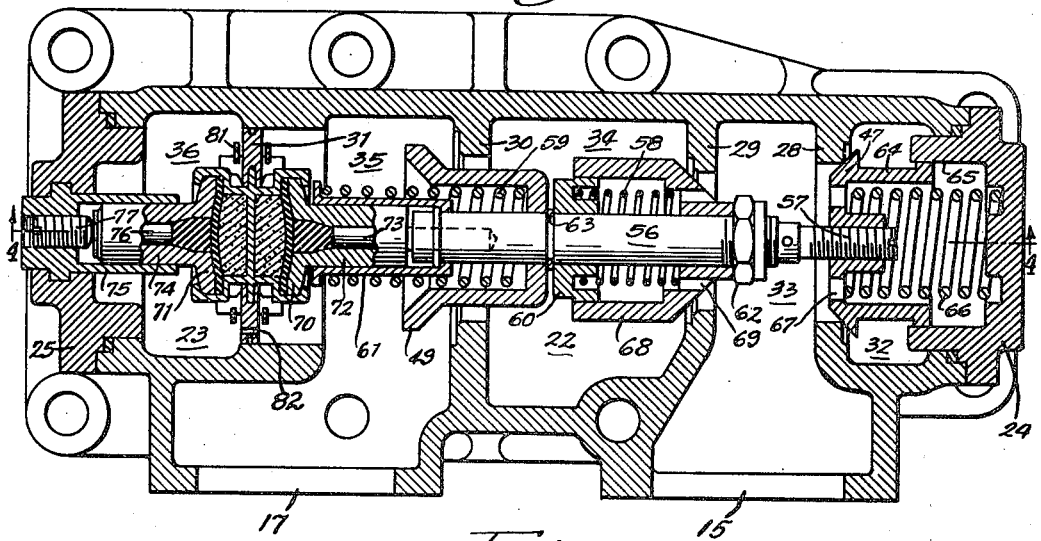
Fig. 3 is a horizontal sectional view taken on the line 3—3 of Fig. 2.

As diagrammatically illustrated in Fig. 1, this valve mechanism 8 is mounted on a heat exchange unit 9 suitably connected in an oil cooling system for an aircraft engine 10, the oil of which is supplied from a reservoir or tank 11. In general practice a pair of pumps 12 and 13 are arranged to pump oil from the reservoir or supply tank 11 to the engine 10 and from the engine back to the tank 11 through the valve mechanism 8. The flow of oil is indicated by the arrows in Fig. 1.

The heat exchange unit 9, for use with which this valve mechanism is particularly designed, is of a more or less conventional design. It generally comprises a cylindrical shell enclosing a bundle of cylindrical tubes the ends of which have been expanded and bonded together so as to provide a core around the tubes wherein the oil is circulated and cooled by means of air passing through these tubes. Such a unit has a warm-up chamber either internally transverse or exteriorly annular. Oil is caused to flow through the core or through the warm-up chamber by the action of the valve mechanism 8, depending upon the temperature of the oil.

The valve mechanism herein shown is an improvement on the valve mechanism shown in applicant's co-pending application Serial No. 510,336, filed November 15, 1943, now Patent No. 2,379,109, dated June 26, 1945. By means of this improvement the oil, in its return to the supply tank, may be required to enter the tank directly adjacent the outlet to the engine, or at a point remote from such oil tank outlet.

This improved valve mechanism comprises a housing 14 partitioned so as to divide the interior into a number of chambers having communication one with another axially of said housing through openings in the partitions and with a pair of main oil inlets 15 and 16, a pair of main oil outlets 17 and 18, and with an associate outlet 19 and a pair of associate inlets 20 and 21. The flow of oil through the various housing chambers, inlets, and outlets, is controlled by a valve mechanism 22 under the influence of thermostatic means 23. Gasketed end caps 24 and 25 are secured in place by suitable cap screws and provide support for the valve mechanism 22, as will be more clearly hereinafter pointed out.

The housing 14 is provided with a base 26 for attachment to a heat exchange unit 9. As will be noted, particularly from Fig. 2, the inlet 15 and the outlet 17 are located on the side of the housing 14, whereas the inlet 16 and the outlet 18 are located at the top of the housing. Stud bolts 27 are fixed on the housing adjacent these inlets and outlets whereby suitable connections may be attached to the housing 14.

Figure 4:
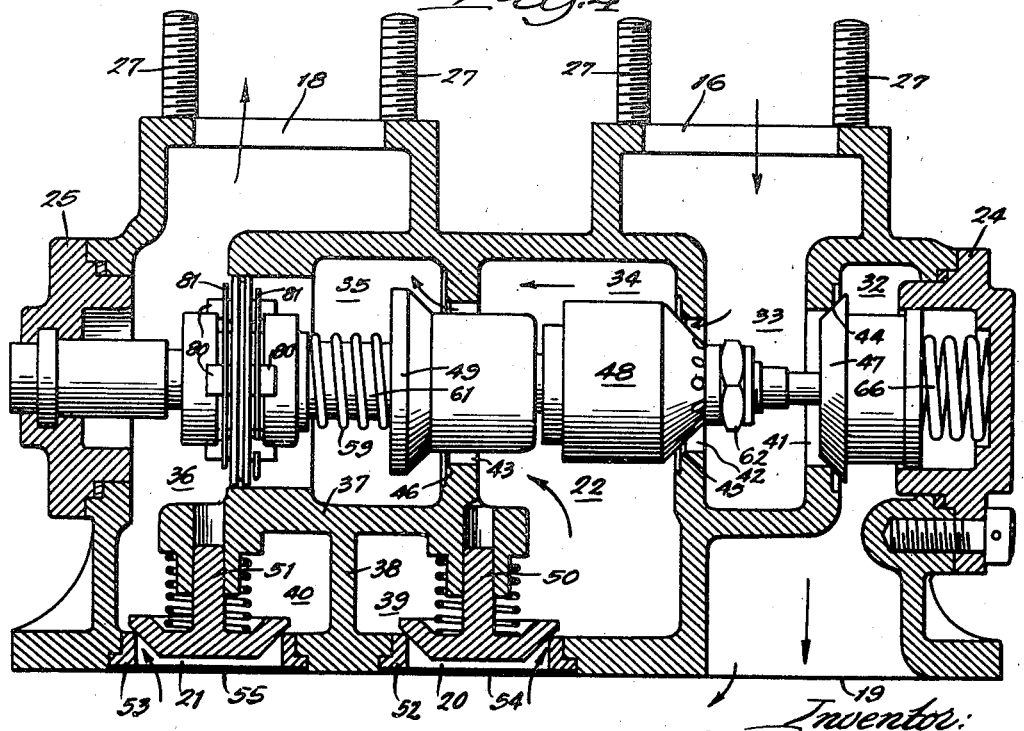
Fig. 4 is a vertical sectional elevation taken on the line 4—4 of Fig. 3.

Within the housing 14 are arranged 3 integral, fixed, transverse partitions 28, 29, and 30 and a transverse movable partition 31. These partitions divide the interior of the housing into chambers 32, 33, 34, 35, and 36 (see Figs. 4 and 5). An axially-disposed partition 37 with its opposite transverse partition 38 forms associate chambers 39 and 40 which communicate with the chambers 35 and 36 and with the associate inlets 20 and 21, respectively.

The three partitions 28, 29, and 30 have formed therein axially-aligned openings 41, 42, and 43, respectively, which provide communication between the chambers on opposite sides of said partitions under the control of the valve mechanism 22. Valve seats 44, 45, and 46 are formed on the perimeters of these partition openings to co-act the valve members 47, 48, and 49, respectively, as will appear more fully hereinafter.

The associate inlets 20 and 21 are controlled by the spring-actuated valve members 50 and 51, respectively, which seat on bushings 52 and 53 secured in place by rings 54 and 55.

The valve mechanism 22 comprises a stem 56 extending axially through the openings 41, 42, and 43 of the respective partitions and supports the valve members 47, 48, and 49 for appropriate co-action with the valve seats 44, 45, and 46 for controlling the flow of oil through said valve housing. The valve stem 56 has a threaded connection 57 with the valve member 47 so that the position of the latter on the stem may be adjusted axially thereof. The valve members 48 and 49 are slidably mounted on the stem 56 and are urged against shoulders 62 and 63, respectively, by springs 58 and 59, arranged between them and co-acting cylindrical members 60 and 61. This permits a relative axial shifting of the valve stem 56 and the valve members 48 and 49 when said valve members are pressed against their seats 45 and 46, respectively, for purposes that will be set forth more fully hereinafter.

The valve member 47 has an extension 64 slidably mounted in a sleeve 64 formed on the inner face of the end cap 24 so as to provide a piston-cylinder effect. A spring 66 is interposed between the valve member 47 and the cap 24 and normally tends to shift the valve stem 56 against the action of the thermostat 23 so as to seat the valve member 47 and consequently unseat the valve members 48 and 49. Apertures 67 formed in the valve member 47 permit oil entering the inlet chamber 33 under pressure to flow back of the valve member 47 and thereby create the same pressure on both sides of the valve. The interior diameter of the cylinder-sleeve 65 is the same as the diameter of the opening 41 so that the effective pressure of the oil on both sides of the valve member 47 is exactly equal. This ensures the movement of the valve member 47 being confined to the pressure differential between the spring 66 and the action of the thermostat 23 under the changing temperature of the oil flowing through the housing 14.

The valve member 48 has an integral sleeve 68 which is slidably engaged by the cylindrical member 60 so as to provide a piston-cylinder effect for this valve member, similar to that provided for the valve member 47. Apertures 69 are formed in the valve member 48 which permit oil entering the inlet chamber 33 under pressure to flow back of the valve member 48 and thus create the same pressure on both sides of the valve member. However, in this case, the interior diameter of the cylinder-sleeve 68 is slightly less than the inner diameter of the valve opening 42. This establishes a condition of imbalance with the valve member 48 due to a differential in the force of the oil pressure acting on opposite sides of the valve member. Therefore, when the valve member 48 is seated under pressure of the thermostat 23 the valve member 48 will retract against the action of the spring 58 to any subsequent increasing of the oil pressure in the chamber 33. The thermostatic means 23 comprises a pair of elements 70 and 71 arranged back to back. These are preferably of the type wherein a waxed substance with a high coefficient of expansion is used as the motive agent. The supporting stem 72 for the thermostat 70 slidably supports the cylindrical member 61 and the enclosed plunger 73 telescopes with and presses against the inner end of the valve stem 56. The stem 74 of the thermostat 71 is slidably supported in a sleeve 75 secured in the end cap 25. The plunger 76 abuts against a screw plug 77 adjustably secured in the end of the sleeve 75.

The partition 31 carried by the thermostats 70 and 71, and which is one of the distinguishing features of this invention over that of the aforesaid co-pending application, comprises a pair of arcuate members 78 and 79 supported on the housing forming a part of the thermostats 70 and 71. This partition 31 engages the housing wall 80 between the chambers 35 and 36 and is movable with said thermostat housing.

As will be noted from Fig. 6, the arcuate members are provided with shoulders 80 which rest on the opposed heads of the thermostats 70 and 71 and the members are held in their assembled position by means of well-known spring rings 81 embracing said shoulders and seated in suitable grooves formed therein. Thus the partition 31 is easily assembled on or removed from the thermostats 70 and 71, as occasion may require.

When the partition 31 is in place, as shown in the drawings, it serves to separate the chambers 35 and 36. This causes the oil flow entering the associate inlet 20, from the heat exchange unit, to pass out through the housing outlet 17. The oil entering the associate inlet 21, from the heat exchange unit, passes out through the main outlet 18. When the partition is removed, the chambers 35 and 36 combine to form a single chamber. By blocking off one of the main outlets 17 or 18 the oil entering the inlets 20 and 21, from the heat exchange unit, would pass out through the other main outlet, exactly as is the case with the structure shown in applicant's co-pending application hereinabove identified.

One or more apertures 82 are formed in each of the members 78 and 79. Moreover, the ends of these members do not quite abut, hence provide a space 83 between them constituting equivalents to the apertures 82. These apertures and small openings in this partition 31 permit a small portion of oil to constantly flow between the chambers 35 and 36. This accomplishes the following results: (1) secures a more rapid heat transfer to the thermostatic elements on both sides of the partition, (2) prevents the building up of an excessive pressure on either side of the partition 31 with the possibility of causing damage either to the partition or one of the thermostats, (3) at the time of starting the engine a small portion of oil is allowed to flow into the core-outlet line and thus tend to force cold oil out of this line so that it will be ready to receive oil from the core when the proper time comes, and (4) in the event that all of the oil flows through the core, and none through the warming jacket and/or by-pass, a small portion of oil will be directed through the auxiliary tank-outlet line to keep this line from congealing in flight.

It should be mentioned that the arrangement of the two main oil inlets 15 and 16 is complementary to the main outlets 17 and 18. Thus, when this valve mechanism is used for the dual return, as herein illustrated, the oil supply line may be connected either at the top or at the side of the housing, dependent upon structural conditions in the plane. Obviously, the other inlet port would be closed with a suitable plate. Moreover, having this complementatry arrangement of main inlets and outlets permits the supply lines to be connected either at the top or at the side of the valve housing when the valve mechanism is used for a single outlet system as intended with applicant's above-mentioned co-pending application.

When the valve mechanism herein shown is used in its preferred arrangement with the partition 31 in place on the thermostatic means 23—as shown in the drawings—the main outlets 17 and 18 are each connected to the tank 11, one by a line 84 and the other by a line 86. The tank 11, in turn, is connected by a line 87 to the engine 10 from which leads a line 88 to one or the other of the inlets 15 or 16. The connection of the line 85 to the tank is below and directly adjacent to the connection of the supply line 87 to the engine, whereas the connection of the line 86 to the tank 11 is remote from the connection of the line 87.

By thus arranging the entrance of the line 85 into the tank so close to the exit of the line 87 therefrom the heat of the oil, by-passing the heat exchange unit 9, is used immediately and effectively to warm the oil in the tank at the point where it is drawn into the line 87. Therefore, in starting the engine, particularly in extremely cold weather when the oil in the line, heat exchange unit, and, perhaps also, in the tank 11 is congealed, the oil traverses the shortest possible path between the engine and the tank. Accordingly, the oil warms up more quickly than would be the case if that returning from the engine through the by-pass of the valve mechanism were introduced into the tank at a point somewhat remote from the connection of the line 87. The result is a material lessening of the time required to have warm oil ready for passage through the warm-up chamber of the heat exchange unit 9, following the necessary shifting of the valve mechanism 22 under the influence of the thermostatic means 23.

The operation of the valve mechanism as herein shown, when used in connection with a heat exchange unit in a cooling system for the lubricating oil for an aircraft engine, is as follows:

The valve mechanism controls the flow of lubricating oil for three different temperature stages:

*First stage.*—A flow by-passing the heat exchange unit 9 when the oil temperature is below 60° to 70° F.

*Second stage.*—A flow through the warm-up chamber of the heat exchange unit 9 when the oil temperature is between 120° and 150° F.

*Third stage.*—A flow through the core of the heat exchange unit 9 when the oil temperature is 165° F. or over.

In the drawings the valve mechanism is shown in position for effecting the first stage of oil flow. The valve member 47, under the action of the spring 66, has closed the opening 41 between the chambers 32 and 33. At that time the valve members 48 and 49 are both retracted. Thus an oil flow is permitted from the main inlet 16 or 17 through the opening 42, the chamber 34, the opening 43, and the chamber 35 directly to the main outlet 18. This would be the position of these parts always when the temperature of the oil is below 60° or 70° F. Under such circumstances, the oil flow is from the tank to the engine through the line 87 and directly back to the tank 11 through the lines 88 and 85, completely by-passing the heat exchange unit 9. Thus, if the oil in the system is badly congealed, the returning of the warm oil to the lower part of the tank will greatly accelerate the decongealing of the oil in the lines and introducing it to the heat exchange unit, over what would be the case if the oil from the engine were returned to the tank at a more remote point.

This first stage flow continues until the temperature of the oil begins to approach 60° or 70° F. At that time, the thermostatic means 23, responding to the rising temperature of the oil, starts to shift the valve stem 56 to the right. This movement of the stem causes a simultaneous movement of the valve members 47 and 48, the former tending to open communication through the opening 41 and the latter tending to close communication through the opening 42.

The second stage of the oil flow will be initiated with the slightest retraction of the valve member 47 and will be fully consummated when the valve member 48 is seated on the valve seat 46. The oil entering the opening 41 is admitted to the warm-up chamber of the heat exchange unit 9 and as it decongeals the oil therein forces it out through the associate inlet 20, through the chamber 34, the opening 43, the chamber 35, and the main outlet 18. The oil is then returned through the line 86 to the upper part of the tank 11.

Weather conditions and engine operation permitting, the flow of oil through the warm-up chamber of the heat exchange unit 9 will tend to thaw out the congealed oil in the core of the unit. As soon as this has been effected to the extent that the oil passing over the thermostat 70 approaches 165° F. the thermostat will be further actuated so as to push the valve stem 56 increasingly to the right. Thereupon the valve member 49 will be brought into contact with the seat 46 and completely close the opening 43. The oil then may no longer enter the chamber 34 through the associate housing inlet 20 because of the back pressure created in the warm-up chamber of the heat exchange unit 9. However, communication is open through the associate inlet 21 into the chamber 40 and thence into the chamber 36 and through the housing outlet 18 to the line 86. Accordingly, the oil finds its flow path through the heat exchange unit core.

During the flow of oil through the chambers 34 and 35 to the associate outlet 17, some oil is admitted to the chamber 36 through the openings in the partition 31. This warm oil tends to condition the oil in the line 86 so that when the valve member 49 does close off the flow through the warm-up chamber of the heat exchange unit, and requires passage through the core, said line is ready to accommodate such an oil flow. Also, during the time that the oil continues to flow through the core and out through the main outlet 18, a small quantity of it is admitted through the openings in the partition 31 to the chamber 37. Thus, the line 85 from the main outlet 17 is conditioned so that, when occasion requires, the flow of oil is the more readily resumed therethrough. Moreover, this constant communication between the chambers 35 and 36 ensures an equalization of the temperature of the oil flow to which both of the thermostats 70 and 71 are exposed.

If, at any time, due to the overall weather conditions and variations in engine operation, the temperature of the oil passing through the core of the heat exchange unit recedes from 165° F., the thermostats 70 and 71 will respond to first unseat the valve member 49 and allow oil to resume its flow through the warm-up chamber and eventually to unseat valve member 48 and seat valve member 47 and allow the oil to completely by-pass the heat exchange unit 9.

Variations and modifications in the details of the structure and arrangement of the parts and the use of the structure with other viscous fluids than oil may be resorted to within the spirit and coverage of the appended claims.

I claim:

1. An oil temperature-regulating valve mechanism comprising, a housing adapted for attachment to a heat exchange unit having dual oil flow paths, said housing having a main oil inlet and a pair of main oil outlets, said housing also having an associate oil outlet for communication with a common inlet to the dual oil flow channels in said heat exchange unit and a pair of associate inlets for communication with the oil outlets from said heat exchange unit, said housing being interiorly partitioned to provide a plurality of chambers certain of which communicate respectively with certain of said inlets and outlets, said partitions having openings formed therein affording communication between the chambers on opposite sides of a respective partition, valve mechanism axially movable in said housing co-acting with said partition openings to control the flow of oil between said housing main oil inlet and one of said housing main oil outlets either directly through said housing or indirectly through said heat exchange unit, a thermostat connected to actuate said valve mechanism, said thermostat being mounted in said housing for exposure to the oil flow through one of said housing main outlets in advance of its discharge therefrom whereby the temperature of the oil determines the flow path through said housing, and a partition movable with said thermostat and separating the housing chambers which communicate with said housing main outlets.

2. An oil temperature-regulating valve mechanism comprising, a housing adapted for attachment to a heat exchange unit having dual oil flow paths, said housing having a main oil inlet and a pair of main oil outlets, said housing also having an associate oil outlet for communication with a common inlet to the dual oil flow channels in said heat exchange unit and a pair of associate inlets for communication with the oil outlets from said heat exchange unit, said housing being interiorly partitioned to provide a plurality of chambers certain of which communicate respectively with certain of said inlets and outlets, said partitions having openings formed therein affording communication between the chambers on opposite sides of a respective partition, valve mechanism axially movable in said housing co-acting with said partition openings to control the flow of oil between said housing main oil inlet and one of said housing main oil outlets either directly through said housing or indirectly through said heat exchange unit, a thermostat connected to actuate said valve mechanism, said thermostat being mounted in said housing for exposure to the oil flow through one of said housing main outlets in advance of its discharge therefrom whereby the temperature of the oil determines the flow path through said housing, and a partition movable with said thermostat and separating the housing chambers which communicate with said housing main outlets, said partition having apertures formed therein to permit oil flow between said chambers.

3. An oil temperature-regulating valve mechanism comprising, a housing adapted for attachment to a heat exchange unit having dual oil flow paths, said housing having a main oil inlet and a pair of main oil outlets, said housing also having an associate oil outlet for communication with a common inlet to the dual oil flow channels in said heat exchange unit and a pair of associate inlets for communication with the oil outlets from said heat exchange unit, said housing being interiorly partitioned to provide a plurality of chambers certain of which communicate respectively with certain of said inlets and outlets, said partitions having openings formed therein affording communication between the chambers on opposite sides of a respective partition, valve mechanism axially movable in said housing co-acting with said partition openings to control the flow of oil between said housing main oil inlet and one of said housing main oil outlets either directly through said housing or indirectly through said heat exchange unit, a thermostat connected to actuate said valve mechanism, said thermostat being mounted in said housing for exposure to the oil flow through one of said housing main outlets in advance of its discharge therefrom whereby the temperature of the oil determines the flow path through said housing, and a partition movable with said thermostat and separating the housing chambers which communicate with said housing main outlets, said partition having apertures formed therein to permit oil flow between said chambers, said partition being detachably mounted to permit removal thereof so as to allow an unrestricted oil flow between aforesaid housing chambers.

4. An oil temperature-regulating valve mechanism comprising, a housing adapted for attachment to a heat exchange unit having dual oil flow paths, said housing being interiorly partitioned to provide end chambers and several intermediate chambers, said partitions having openings formed therein in axial alinement lengthwise of said housing so as to afford communication between various chambers axially of and within said housing, said housing having a main fluid inlet communicating with a chamber adjacent one of said end chambers and a pair of main outlets communicating respectively with the other end chamber and the chamber next adjacent thereto, said housing also having an associate oil outlet providing communication between said first end chamber and a common inlet to the dual oil flow channels in said heat exchange unit and a pair of associate inlets providing communication between said other end chamber and the chamber adjacent thereto and the oil outlets from said heat exchange unit respectively, thermostat means arranged in said housing to be exposed to the oil flow through the chambers connected to said main outlets, a valve stem connected to said thermostat means and extending through all of said chambers and partition openings for axial movement by said thermostat, a pair of valves mounted on said stem and located in chambers on opposite sides of said inlet chamber and adapted to be seated against opposite sides of the partitions bounding said main fluid inlet chamber, said valves being normally positioned relative to each other on said stem whereby when one valve is seated the other is retracted, a third valve mounted on said stem and adapted for seating on the partition separating the main fluid outlet chamber adjacent said other end chamber and the chamber intermediate said adjacent chamber and said inlet chamber, and a member mounted on said thermostatic means and contacting the walls of said housing so as to provide a movable partition separating said other end chamber and said adjacent chamber.

5. An oil temperature-regulating valve mechanism comprising, a housing adapted for attachment to a heat exchange unit having dual oil flow paths, said housing being interiorly partitioned to provide end chambers and several intermediate chambers, said partitions having openings formed therein in axial alinement lengthwise of said housing so as to afford communication between various chambers axially of and within said housing, said housing having a main fluid inlet communicating with a chamber adjacent one of said end chambers and a pair of main outlets communicating respectively with the other end chamber and the chamber next adjacent thereto, said housing also having an associate oil outlet providing communication between said first end chamber and a common inlet to the dual oil flow channels in said heat exchange unit and a pair of associate inlets providing communication between said other end chamber and the chamber adjacent thereto and the oil outlets from said heat exchange unit respectively, thermostat means arranged in said housing to be exposed to the oil flow through the chambers connected to said main outlets, a valve stem connected to said thermostat means and extending through all of said chambers and partition openings for axial movement by said thermostat, a pair of valves mounted on said stem and located in chambers on opposite sides of said inlet chamber and adapted to be seated against opposite sides of the partitions bounding said main fluid inlet chamber, said valves being normally positioned relative to each other on said stem whereby when one valve is seated the other is retracted, a third valve mounted on said stem and adapted for seating on the partition separating the main fluid outlet chamber adjacent said other end chamber and the chamber intermediate said adjacent chamber and said inlet chamber, and a member mounted on said thermostatic means and contacting the walls of said housing so as to provide a movable partition separating said other end chamber and said adjacent chamber, said member having apertures formed therein to permit an oil flow between the chambers on opposite sides thereof.

6. An oil temperature-regulating valve mechanism comprising, a housing adapted for attachment to a heat exchange unit having dual oil flow paths, said housing being interiorly partitioned to provide end chambers and several intermediate chambers, said partitions having openings formed therein in axial alinement lengthwise of said housing so as to afford communication between various chambers axially of and within said housing, said housing having a main fluid inlet communicating with a chamber adjacent one of said end chambers and a pair of main outlets communicating respectively with the other end chamber and the chamber next adjacent thereto, said housing also having an associate oil outlet providing communication between said first end chamber and a common inlet to the dual oil flow channels in said heat exchange unit and a pair of associate inlets providing communication between said other end chamber and the chamber adjacent thereto and the oil outlets from said heat exchange unit respectively, thermostat means arranged in said housing to be exposed to the oil flow through the chambers connected to said main outlets, a valve stem connected to said thermostat means and extending through all of said chambers and partition openings for axial movement by said thermostat, a pair of valves mounted on said stem and located in chambers on opposite sides of said inlet chamber and adapted to be seated against opposite sides of the partitions bounding said main fluid inlet chamber, said valves being normally positioned relative to each other on said stem whereby when one valve is seated the other is retracted, a third valve mounted on said stem and adapted for seating on the partition separating the main fluid outlet chamber adjacent said other end chamber and the chamber intermediate said adjacent chamber and said inlet chamber, and a pair of complementary arcuate members mounted on said thermostatic means to form a disc contacting the walls of said housing so as to provide an axially-movable partion between said other end chamber and said adjacent outlet chamber.

7. An oil temperature-regulating valve mechanism comprising, a housing adapted for attachment to a heat exchange unit having dual oil flow paths, said housing being interiorly partitioned to provide end chambers and several intermediate chambers, said partitions having openings formed therein in axial alinement lengthwise of said housing so as to afford communication between various chambers axially of and within said housing, said housing having a main fluid inlet communicating with a chamber adjacent one of said end chambers and a pair of main outlets communicating respectively with the other end chamber and the chamber next adjacent thereto, said housing also having an associated oil outlet providing communication between said first end chamber and a common inlet to the dual oil flow channels in said heat exchange unit and a pair of associate inlets providing communication between said other end chamber and the chamber adjacent thereto and the oil outlets from said heat exchange unit respectively, thermostat means arranged in said housing to be exposed to the oil flow through the chambers connected to said main outlets, a valve stem connected to said thermostat means and extending through all of said chambers and partition openings for axial movement by said thermostat, a pair of valves mounted on said stem and located in chambers on opposite sides of said inlet chamber and adapted to be seated against opposite sides of the partitions bounding said main fluid inlet chamber, said valves being normally positioned relative to each other on said stem whereby when one valve is seated the other is retracted, a third valve mounted on said stem and adapted for seating on the partition separating the main fluid outlet chamber adjacent said other end chamber and the chamber intermediate said adjacent chamber and said inlet chamber, a pair of complementary arcuate members mounted on said thermostatic means to form a disc contacting the walls of said housing so as to provide an axially-movable partition between said other end chamber and said adjacent outlet chamber, and removable yielding means adapted to clamp said arcuate members in complementary position on said thermostatic means.

8. An oil temperature-regulating valve mechanism comprising, a housing adapted for attachment to a heat exchange unit having dual oil flow paths, said housing being interiorly partitioned to provide end chambers and several intermediate chambers, said partitions having openings formed therein in axial alinement lengthwise of said housing so as to afford communication between various chambers axially of and within said housing, said housing having a main fluid inlet communicating with a chamber adjacent one of said end chambers and a pair of main outlets communicating respectively with the other end chamber and the chamber next adjacent thereto, said housing also having an associate oil outlet providing communication between said first end chamber and a common inlet to the dual oil flow channels in said heat exchange unit and a pair of associate inlets providing communication between said other end chamber and the chamber adjacent thereto and the oil outlets from said heat exchange unit respectively, thermostat means arranged in said housing to be exposed to the oil flow through the chambers connected to said main outlets, a valve stem connected to said thermostat means and extending through all of said chambers and partition openings for axial movement by said thermostat, a pair of valves mounted on said stem and located in chambers on opposite sides of said inlet chamber and adapted to be seated against opposite sides of the partitions bounding said main fluid inlet chamber, said valves being normally positioned relative to each other on said stem whereby when one valve is seated the other is retracted, a third valve mounted on said stem and adapted for seating on the partition separating the main fluid outlet chamber adjacent said other end chamber and the chamber intermediate said adjacent chamber and said inlet chamber, a pair of complementary arcuate members mounted on said thermostatic means to form a disc contacting the walls of said housing so as to provide an axially-movable partition between said other end chamber and said adjacent outlet chamber, and removable yielding means adapted to clamp said arcuate members in complementary position on said thermostatic means, each of said arcuate members having one or more apertures formed therein to permit oil flow between said chambers.

JOE C. SHAW.

REFERENCES CITED

The following references are of record in the file of this patent:

UNITED STATES PATENTS

| Number | Name | Date |
|---|---|---|
| 2,288,599 | Ramsaur | July 7, 1942 |
| 2,289,097 | Brinen | July 7, 1942 |
| 2,353,577 | Magrum | July 11, 1944 |
| 2,374,639 | Miller | Apr. 24, 1945 |
| 2,395,943 | Skelly | Mar. 5, 1946 |
| 2,396,053 | McEntire | Mar. 5, 1946 |

FOREIGN PATENTS

| Number | Country | Date |
|---|---|---|
| 547,350 | Great Britain | Aug. 24, 1942 |